United States Patent [19]

Weaver et al.

[11] Patent Number: 4,683,011

[45] Date of Patent: Jul. 28, 1987

[54] HIGH PENETRATION, HIGH SPEED, AGGLOMERATED WELDING FLUX

[75] Inventors: Robert J. Weaver, Mentor; Ronald F. Young, Willoughby; Dennis D. Crockett, Mentor, all of Ohio

[73] Assignee: The Lincoln Electric Company, Cleveland, Ohio

[21] Appl. No.: 901,136

[22] Filed: Aug. 28, 1986

[51] Int. Cl.⁴ .................................................. B23K 35/34
[52] U.S. Cl. ............................................ 148/26; 148/24
[58] Field of Search ..................................... 148/26, 21

[56] References Cited

U.S. PATENT DOCUMENTS

| | | | |
|---|---|---|---|
| 2,719,801 | 10/1955 | Stringham et al. | 148/26 |
| 2,755,211 | 7/1956 | Jackson et al. | 148/26 |
| 2,805,971 | 9/1957 | Bryan | 148/26 |
| 2,814,579 | 11/1957 | Stringham et al. | 148/26 |
| 2,868,681 | 1/1959 | Shrubsall et al. | 148/26 |
| 2,960,422 | 11/1960 | Symonds | 148/26 |
| 3,023,133 | 2/1962 | Lewis et al. | 148/26 |
| 3,078,193 | 2/1963 | Jackson | 148/26 |
| 3,192,077 | 6/1965 | Ballass et al. | 148/26 |
| 3,211,591 | 10/1965 | Miltschitzky et al. | 148/26 |
| 3,305,408 | 2/1967 | Dick | 148/26 |
| 3,328,212 | 6/1967 | Coless | 148/26 |
| 3,340,104 | 9/1967 | Ballass et al. | 148/26 |
| 3,340,105 | 9/1967 | Ballas et al. | 148/26 |
| 3,340,106 | 9/1967 | Ballas et al. | 148/26 |
| 3,340,107 | 9/1967 | Ballas et al. | 148/26 |
| 3,393,102 | 7/1968 | Carroll et al. | 148/26 |
| 3,480,487 | 11/1969 | Coless et al. | 148/26 |
| 3,490,942 | 1/1970 | Lalieu | 148/26 |
| 3,551,137 | 12/1970 | Krishna | 148/26 |
| 3,554,792 | 1/1971 | Johnson | 148/26 |
| 3,663,313 | 5/1972 | Oberly et al. | 148/23 |
| 3,692,590 | 9/1972 | Godai et al. | 148/23 |
| 3,769,099 | 10/1973 | DeLong et al. | 148/26 |
| 4,017,339 | 4/1977 | Okuda | 148/24 |
| 4,036,671 | 7/1977 | DeHaeck | 148/24 |
| 4,221,611 | 9/1980 | Nagano et al. | 148/26 |
| 4,338,142 | 7/1982 | Okuda et al. | 148/26 |
| 4,363,676 | 12/1982 | Crockett et al. | 148/24 |
| 4,436,562 | 3/1984 | Tokuhisa et al. | 148/24 |

*Primary Examiner*—Peter D. Rosenberg
*Attorney, Agent, or Firm*—Body, Vickers & Daniels

[57] ABSTRACT

An agglomerated submerged arc welding flux which offers the advantages of an agglomerated flux, namely lower cost, increased impact strength, greater formulation flexibility and operator appeal while, in other respects, performing like a fused flux, namely providing: high speed; high penetration; and low bead profile characteristics. The flux contains relatively large amounts of calcium oxide and titanium dioxide as essential ingredients together with other known fluxing ingredients in lesser amounts.

4 Claims, No Drawings

HIGH PENETRATION, HIGH SPEED, AGGLOMERATED WELDING FLUX

This invention pertains to the art of electric arc welding, and more particularly, to an improved formulation for an agglomerated granular flux to be used in the submerged arc welding of low carbon steels.

The invention is particularly applicable to the electric arc welding of the abutting and longitudinally extending edges of a heavy steel plate formed into a cylindrical pipe and will be described with particular reference thereto, although it will be appreciated that the invention has broader applications and can be used wherever deep penetration and flat bead profile characteristics are required.

BACKGROUND

Large diameter steel pipe is formed by bending a flat plate of low carbon steel of the desired thickness into a tube with the longitudinally extending edges abutting. A windrow of granular flux is deposited on these edges of the first side to be welded and one or more electrically energized mild steel or low alloy steel electrode(s) is advanced through the windrow to establish an arc between the end of the electrode(s) and the longitudinally extending edges. The electrode(s) is then moved along the edges. The arc melts both the edges and the end of the electrode(s) to form a molten weld puddle which solidifies as the electrode(s) moves on. At the same time, the arc melts some of the granular flux which floats on top of the molten weld puddle and solidifies after the molten steel in the weld pool puddle solidifies, thus protecting the weld puddle from the atmosphere and shaping the surface of the solidified weld bead and giving it an appropriate surface texture. The unmelted flux is then recovered and can be reused. The melted flux, now solidified as a slag, is then removed and usually reprocessed. The edges are then welded from the reverse side with the bottom of the weld overlapping or intersecting with the weld from the opposite side. The pipe is then usually stressed by hydraulic pressure on the inside sufficient to stress the metals beyond the yield point and make the pipe round. The requirements of a flux for pipe fabrication are deep penetration, so that the weld can be accomplished in two passes (one inner and one outer), a low weld bead profile so that no or a minimum of weld metal must be removed to give a smooth pipe contour and no undercutting at the edges.

The fluxes used are mixtures of various known fluxing ingredients such as the fluorides selected from the group of calcium, sodium, potassium, barium, magnesium, strontium and lithium, the oxides selected from the group of aluminum, magnesium, silicon, strontium, titanium, calcium, zirconium, manganese, and potassium, and the like and sometimes deoxidizers, all in carefully controlled proportions selected to give: a desired solidifying temperature to the molten slag; desired slag removal characteristics; desired welding characteristics; and, most importantly, desired mechanical properties to the deposited weld bead.

The various flux ingredients, in powdered form, are thoroughly intermixed and then either: fused by heating to a temperature where all of the ingredients are melted so as to react with one another, allowed to cool, and, finally crushed to a desired granule size; or, agglomerated by including a low temperature binder, such as sodium or potassium silicate, in the mixture and then heating the mixture to a temperature sufficient to dry the binder and bind the other ingredients in unreacted state into granules of the desired size.

Fused fluxes, assuming the same ingredients, are more expensive to manufacture than agglomerated fluxes because of: the greater energy requirements to melt all of the ingredients; the cost of sophisticated equipment to withstand the higher temperatures; and, the additional steps of cooling the liquid mass to a solid and then crushing it to the desired granule size.

Agglomerated fluxes require the use of a relatively inexpensive binder. With the lower firing temperatures and the fact that the ingredients are never in a liquid state, they inherently form into granules of the desired size in the manufacturing process which normally employs a rotating heated kiln.

Agglomerated fluxes are easier for the operator to handle. They are granular and can be handled easily with no discomfort. Fused fluxes may be likened to broken glass with the granules sometimes being sliver like or having sharp edges.

Agglomerated fluxes do not melt as easily as fused fluxes so that less agglomerated flux is consumed when welding. This decreases the cost of producing a weld which is very desirable.

Agglomerated fluxes also allow greater flexibility in adding alloying metals to the formulation because at the high temperatures necessary to melt fused fluxes, such metals are consumed. Alternatively, the metals in powder form may be added to the crushed granules but problems result here because during shipment, the powdered metals tend to settle out of fused fluxes. In agglomerated fluxes, the powdered metals may be mixed with the ingredients before heating and are evenly distributed throughout the agglomerated granules.

Agglomerated fluxes produce a deposition rate which can be 25% higher than similar fused fluxes at the same welding current. This results in higher productivity which is an advantage in most applications where increased deposition rates reduce the welding time required to fill a given joint volume or to produce the required weld size. In pipe manufacture, however, a high deposition rate is not desirable because it results in excess weld reinforcement and a poor weld profile. For this application it is desirable to produce a low weld profile with a minimal change in the contour of the surface of the welded pipe.

Prior to the present invention, agglomerated fluxes had an additional disadvantage in pipe welding when compared to the fused fluxes, namely, for a given weld current the penetration of the weld into the base metal was less than that produced by comparable fused fluxes. High penetration is necessary to ensure that after the inner and outer weld passes are completed, the weld extends across the entire thickness of the abutting edges to ensure that the weld seam will not be weaker than the rest of the pipe. This is particularly important because of the exceedingly high stresses imposed on the weld bead during the hydraulic forming step. However, if the welding current were increased to increase the penetration, then the deposition rate became so high as to produce a weld bead with a high profile. High penetration is also desirable because it provides sufficient overlapping of the weld beads made from each side of the pipe to ensure tie-in without requiring critical tolerances for the alignment of the welding electrodes with the butted seam.

Heretofore, despite the cost and other advantages of an agglomerated flux above described, operators welding the longitudinally extended edges of a formed pipe have preferred the fused fluxes because of the high penetration, low bead profile characteristics obtainable with such fluxes.

THE INVENTION

The present invention contemplates a new and improved formulation of an agglomerated, electric arc welding flux which combines the well known advantages of the agglomerated fluxes with the ability to produce a deposit like that of a fused flux.

In accordance with the invention, an agglomerated flux formulation for the welding of low carbon steels is provided which includes higher amounts of both calcium oxide and titanium dioxide in combination than has heretofore been used in agglomerated flux and, in particular, includes a combination of titanium dioxide, calcium oxide, aluminum oxide, silicon dioxide and the fluorides, which, when agglomerated, results in the high penetration heretofore only available with fused fluxes while at the same time providing the deposition rate and low bead profile of such fluxes.

In a more limited sense, a formulation for an agglomerated flux for use in the submerged arc welding of steel is provided which includes a mixture of the usual ingredients found in fluxes, such as one or more of the fluorides of calcium, lithium, aluminum, magnesium, potassium, sodium, strontium, or barium in total amounts from 0 to 15 weight percent; one or more of the oxices of aluminum, silicon, zirconium, magnesium, strontium, potassium, manganese, plus as essential ingredients both calcium oxide in amounts of from 11% to 25%; titanium dioxide in amounts of from 18% to 30%, all agglomerated into free flowing granules by a suitable binder such as sodium silicate or potassium silicate.

More specifically in accordance with the invention, an agglomerated welding flux is provided comprised of the following principal ingredients in weight percent of the total dry weight.

|  | Min. | Max. | Optimum |
|---|---|---|---|
| Calcium Oxide | 11 | 25 | 16 |
| Titanium Dioxide | 18 | 30 | 23 |
| Aluminum Oxide | 8 | 20 | 11 |
| Silicon Dioxide | 20 | 40 | 32 |
| Sodium Oxide | 0 | 5 | 3 |
| Fluorides of Calcium, Sodium, Potassium, Barium, Magnesium, Strontium, and/or Lithium | 0 | 15 | 11 |
| Potassium Oxide | 0 | 3.5 | 0.6 |
| Metallic Mn + Si | 0 | 5.0 | 1.0 |

Calcium oxide is quite hygroscopic and is normally present as a stable complex compound with $SiO_2$ and/or $Al_2O_3$.

The sodium oxide is present as a silicate which functions as a binder for the other ingredients. Sodium oxide can also be present as some form of mineral.

Thus, the silicon dioxide is normally present as a complex compound with both the sodium and calcium oxides. It can also be present as free quartz.

Calcium fluoride is the most compatible and least expensive of the fluorides and is preferred. Fluoride compounds are used in some amounts to provide protection from the atmosphere and lower the melting range of the slag. Too much fluoride adversely affects the arc stability and can increase the tendency for undercutting at the edges of the weld bead.

The potassium oxide gives improved arc stability when using A.C. electric power.

Oxides of manganese tend to cause a release of gases under the molten flux which become trapped there as the slag freezes and cause an undesirable gas marking of the weld bead surface. Therefore, they are normally not used or are employed in limited amounts.

The flux ingredients may also include various known alloying ingredients such as manganese, silicon, and the like, which will transfer to the weld bead and alloy therewith in accordance with known principles.

While no explanation can be given for the success of the invention, it is believed that the low viscosity of the mixture of the high amounts of calcium oxide and titanium dioxide in the liquid state at the temperatures encountered while are welding is responsible for excellent wetting of the bead and the low bead profile. Also, the titanium oxide stabilizes the arc.

It is to be noted that the flux formulation does not include any of the known potent metallic deoxidizers, such as zirconium, titanium, aluminum or magnesium, which metals would function to reduce the oxides in the flux formulation with the residuals transferring to the weld bead where they could adversely alloy the weld metal causing embrittlement and cracking. The present invention does not require such deoxidizers.

Thus, it will be seen that the principle object of the invention is the provision of a new and improved formulation for an agglomerated electric arc welding flux which welds like a fused flux.

Another object of the invention is the provision of a new and improved formulation for an agglomerated electric arc welding flux which retains the advantages of low cost, low flux consumption, ease of manufacture, ease of including alloying ingredients of an agglomerated flux while having the welding characteristics of a fused flux.

Another object of the invention is the provision of a new and improved agglomerated electric arc welding flux which is usable in the welding of longitudinal seams or spiral seams in large and small diameter pipes.

Using the present invention, applicants' assignee has been able to obtain weld beads on the longitudinally extending edges of welding pipe fully equal in quality, bead shape, penetration, impact strength and the like, heretofore produced by a fused flux with resultant economies of a flux which is more economical to manufacture, has operator appeal and is easily handled by the welding operator.

The invention has been described with reference to a preferred embodiment and with reference to a range of ingredients which it is believed will perform in accordance with the objectives of the invention. Obviously, modifications and alterations will occur to others upon a reading and understanding of this specification and it is our intention to include all such modifications and alterations insofar as they come within the scope of the appended claims.

Having described our invention, we claim:

1. An agglomerated flux for electric arc welding comprised of fluorides selected from the group of calcium, sodium, potassium, barium, aluminum, magnesium, strontium and lithium and oxides selected from the group of aluminum, magnesium, silicon, strontium, titanium, calcium, zirconium, manganese and potassium wherein calcium oxide is present in amounts of from 11% to 25% and titanium dioxide is present in amounts of from 18% to 30% expressed as a percent of the total weight.

2. The flux of claim 1 comprised of the following ingredients in weight percent:

|  | Min. | Max. |
|---|---|---|
| Calcium Oxide | 11 | 25 |
| Titanium Dioxide | 18 | 30 |
| Aluminum Oxide | 8 | 20 |
| Silicon Dioxide | 20 | 40 |
| Sodium Oxide | 0 | 5 |
| Fluorides of Calcium, Sodium, Potassium, Barium, Magnesium, Strontium, and/or Lithium | 0 | 15 |
| Potassium Oxide | 0 | 3.5 |
| Metallic Mn + Si | 0 | 5.0 |

3. The flux of claim 1 comprised of the following ingredients in weight percent in the approximate amounts stated:

| Calcium Oxide | 16 |
|---|---|
| Titanium Dioxide | 23 |
| Aluminum Oxide | 11 |
| Silicon Dioxide | 32 |
| Sodium Oxide | 3.0 |
| Calcium Fluoride | 11 |
| Potassium Oxide | 0.6 |
| Metallic Mn + Si | 1.0 |

4. The flux of claim 1 comprised of the following ingredients in weight percent in the approximate amounts stated:

| Calcium Oxide | 16 |
|---|---|
| Titanium Dioxide | 23 |
| Aluminum Oxide | 11 |
| Silicon Dioxide | 32 |
| Sodium Oxide | 03 |
| Fluorides of Calcium, Sodium Potassium, Barium Magnesium, Strontium, and/or Lithium | 11 |
| Potassium Oxide | 0.6 |
| Metallic Mn plus Si | 1.0 |

* * * * *